V. MÜLLER.
APPARATUS FOR CUTTING THREADS ON TUBES AND FOR CUTTING OFF TUBES.
APPLICATION FILED JAN. 5, 1909.

1,017,898.

Patented Feb. 20, 1912.

Inventor
Victor Müller
By Knight Bros.
Attorneys

Witnesses
J. M. Wynkoop,
C. B. Melton

UNITED STATES PATENT OFFICE.

VICTOR MÜLLER, OF BERLIN, GERMANY.

APPARATUS FOR CUTTING THREADS ON TUBES AND FOR CUTTING OFF TUBES.

1,017,898. Specification of Letters Patent. Patented Feb. 20, 1912.

Application filed January 5, 1909. Serial No. 470,799.

*To all whom it may concern:*

Be it known that I, VICTOR MÜLLER, a subject of the German Emperor, and resident of Berlin, Germany, have invented certain new and useful Improvements in Apparatus for Cutting Threads on Tubes and for Cutting Off the Tubes, of which the following is a specification.

The present invention relates to a combined threading and cutting machine for tubular bodies, and has for its purpose to provide a machine of that character wherein the piece to be worked may be threaded and cut without removing the piece from its originally secured position, thereby considerably reducing the cost of manufacture of this material, and considerably expediting the time in which the work may be done.

It has heretofore been attempted to construct a combined machine which will perform the cutting and threading operations, but in machines of that kind of the known type there is arranged a thread cutting apparatus with screw-dies and a radially shiftable cutter for cutting off the tubes, but in order to perform this latter operation properly, the dies have to be replaced by sliding blocks, but this method has been found to be both troublesome and time-taking, since in the time required for changing the thread cutting apparatus to the cutting off apparatus, the piece to be worked can be cut off with a separate cutter far more rapidly. By the present invention, however, a single apparatus serves the double function of threading a tube or for cutting off the same, and said apparatus is adjusted and operated through precisely the same means.

With these advantages, the present invention embodies other points of merit, which will be set forth in the course of the following extended description and in the appended claims.

Figure 1:
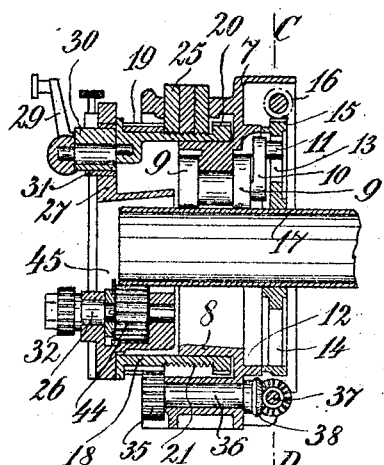
Figure 2:
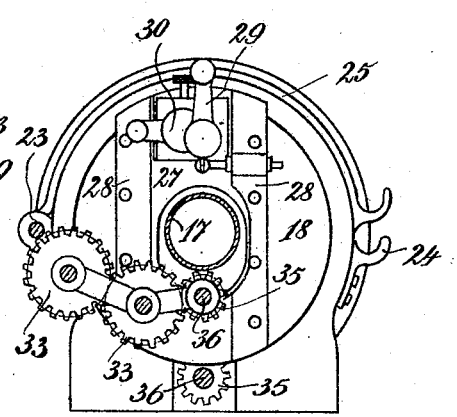
Figure 6:
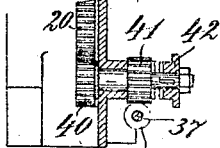
Figure 4:
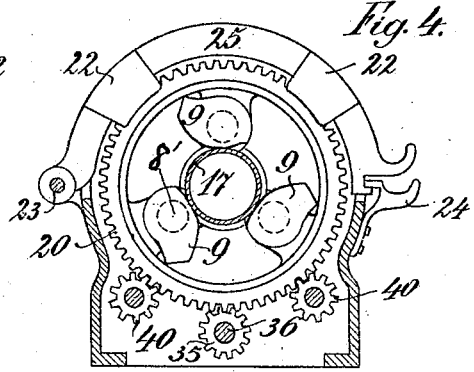
Figure 3:
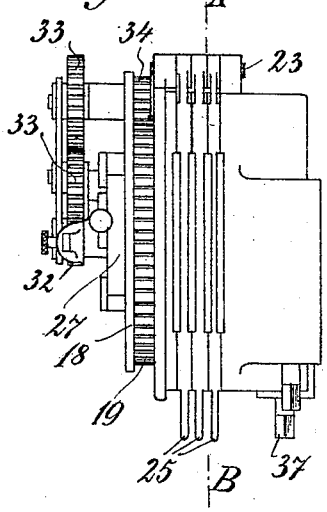
Figure 5:
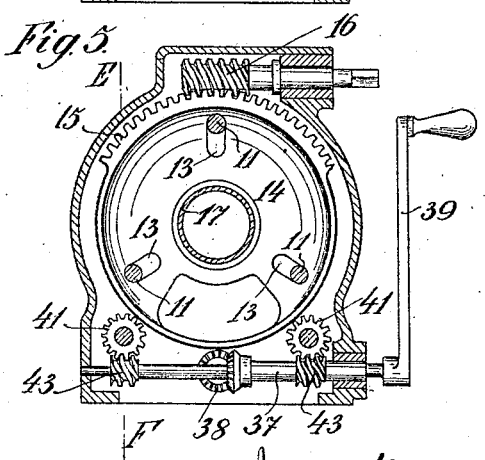

Referring to the accompanying drawing, wherein is shown the invention in its preferred embodiment, Figure 1 is a longitudinal sectional view of the machine; Fig. 2 is a front elevation thereof; Fig. 3 is a top plan view; Fig. 4 is a cross section on the line A—B of Fig. 3; Fig. 5 is a cross section on the line C—D of Fig. 1, and Fig. 6 is a cross section on the line E—F of Fig. 5.

Referring to the several figures in detail, wherein like numerals of reference indicate corresponding parts of the different figures shown, the structure comprises a substantially cylindrical casing 7 having an inner ring portion 8, from which projects from three points, the bearing studs 8'. Within each of the studs 8' is journaled a pair of clamping blocks 9, and each of the outer blocks 9 is provided with a crank 10 at the far end of which is fitted a pin 11. The pins 11 engage within radially disposed slots 13 of a clamping plate 14 contained within the casing 7, and which plate has for its function to turn the clamping blocks 9 into effective position for gripping the tube 17 to be worked in precisely that manner shown in Figs. 1 and 4. The means for effecting the operation of the clamping plate 14 comprises a worm gear 16 that is journaled within the casing 7 and engages with teeth 15 carried on the upper peripheral edge of said clamping plate. By turning the screw 16 through the medium of a wrench or other means, the clamping plate 14 is partially rotated, thus causing the jaws of the clamping blocks 9 to clamp between them the tube or piece 17 to be worked.

Mounted to rotate and have shifting movement upon the rim 8 of the casing 7, is a tubular body 18 which in turn supports, on one end, a loosely rotating band or spur gear 19, and which has its opposite end designed with a fixed spur gear 20, and that surface of the body 18 intermediate the gears 19 and 20 is provided with threads 21 of different pitches. The series of threads 21 are each adapted to be engaged respectively by a pair of feeding nuts or blades 22 carried on the mandrel levers 25, which are pivoted to the casing 7 at 23, and for holding said feeding members into engagement with the threads, each of said levers is provided with a locking device 24 (see Fig. 4). The feeding members 22 of the mandrel levers 25 have a pitch commensurate with the pitch of their respective series of threads, in order to be able to vary the axial advance of the thread cutter according to the thread to be cut. There is also arranged in the second casing 18, a pair of vertically disposed guideways 28, within which is mounted to move the tool carrying frame 27, said movement being derived through the means of an eccentric 30, which is journaled within the frame 18 and which is provided with an operating handle 29. The eccentric 30, which acts in the capacity of a cam, contacts directly with a wearing plate 31 which is carried by the frame 27. It is clear, however, that the plate 31 may be substituted by having a slot or guideway within the frame 27, within which the eccentric 30 could operate.

Journaled within the bottom portion of the frame 27 is a stub shaft 26 having mounted thereon the thread cutting die 44 and the circular saw or pipe cutter 45, both of which members are disposed wholly within the frame 27 (see Fig. 1). On its outer end the shaft 26 carries a spur gear 32, by which both of the tools are operated, and which in turn derives its power from the pair of pinions 33, spur gear 34, band gear 19, spur gear 35, which latter is mounted on a counter-shaft 36, which has at its opposite end the bevel pinion 38. The pinion 38 meshes with a like pinion carried on the shaft 37, to which is connected the operating crank 39 (see Fig. 5).

From the foregoing, it will be readily seen that either of the tools 44 or 45 may be brought into operative position with respect to its work through the medium of the frame adjusting means 29 and 30, and that said tools may be brought into such position for effecting a degree of cutting which may be determined by said adjusting means. Since these tools must execute a planetary movement around the piece to be worked, there is journaled in the casing a pair of spur gears 40 which mesh with the toothed rim 20 of the tubular casing 18 in the manner shown in Fig. 6. On each of the spindles supporting the spur gears 40 there is loosely mounted a spur gear 41, and splined on each of said spindles is also a clutch 42 whose function is to engage a complementary part of the wheel 41 and thereby bring the same into driving connection with a worm wheel 43, of which there are two mounted on the shaft 37 for said gear wheels. The ratio of transmission of one of the pairs of gears 41, 43, is different from that of the other, whereby to vary the speed with which the thread cutting die makes its planetary movement around the piece to be worked. To effect this, one or the other of the couplings 42 is thrown into position.

Assuming now that a pipe 17 has been clamped in position for working and that the same is now to be screw-threaded, one of the levers 25 selected according to the pitch of thread desired, is lowered to bring its guiding members 22 into engagement with its respective series of threads 21, and in this position is locked through the medium of the latches 24. The crank 39 is then turned and through the train of gearing just described, the die 44 performs its function, it being understood, of course, that the tube 17 is being moved longitudinally of its axis simultaneously with the planetary movement of the die 44.

When it is desired to cut a tube, the several levers 25 are brought into inoperative position, in order that there will be no lateral movement of the piece to be cut. With this effected, the cutter 45 is then brought into operative position through the medium of the adjustment described and the machine is then in condition for operation.

Having thus described my invention, what I claim as new therein and desire to secure by Letters Patent is:—

1. In a threading and shearing device, a revoluble, axially movable and around the axis of the stock rotatable spindle, in combination with a circular shearing tool and a circular threading tool, said threading tool having teeth for cutting a number of threads at once and both of said tools secured to said spindle, and simultaneously partaking of the several movements of said spindle.

2. In a threading and shearing device, a revoluble, axially movable, around the axis of the stock rotatable and radially displaceable spindle, in combination with a circular threading tool having teeth for cutting a number of threads at once and a circular shearing tool, both of said tools secured to and simultaneously partaking of the several movements of said spindle.

3. In a threading and shearing device, a revoluble, axially movable, around the axis of the stock rotatable and radially displaceable spindle, in combination with a circular threading tool having teeth for cutting a number of threads at once and a circular shearing tool, both of said tools secured to and simultaneously partaking of the several movements of said spindle, and means for imparting said revoluble, rotatable and radial movements singly or in any combination to spindle and tools.

4. In a threading and shearing device the combination of a circular threading tool and a circular shearing tool mounted on one spindle, said threading tool having teeth for cutting a number of threads at once, a tubular body or drum mounted concentrically with and revolving around the axis of the stock and constructed to impart a planetary movement to said tools and spindle, substantially as set forth.

5. In a threading and shearing device the combination of a circular threading tool and a circular shearing tool mounted on one spindle, said threading tool having teeth for cutting a number of threads at once, a tubular body or drum mounted concentrically with, and revolving around the axis of the stock and constructed to impart simultaneously an axial movement to said tools and spindle.

6. In a threading and shearing device the combination of a circular threading tool and a circular shearing tool mounted on one spindle, said threading tool having teeth for cutting a number of threads at once, a tubular body or drum mounted concentrically with and revolving around the axis of the stock, and means for axially moving said drum together with said spindle and tools, comprising a plurality of externally threaded portions of different pitch on said drum, said threaded portions made to engage, one at the time, correspondingly threaded feeding levers placed across said drum, for and with the purpose of imparting a plurality of feeding speeds to the said tools.

7. A threading and shearing device for tubes, comprising a stationary housing with jaws for clamping the stock inside of, and concentric with said housing; a sleeve mounted to be rotatable and axially slidable in said housing; a working tool radially adjustable in said sleeve; said tool constructed as a unit of two milling cutters of different diameter, mounted in immediate proximity of each other on one spindle; the smaller diameter of the tool serving for threading the pipe and having teeth for cutting a number of threads at once, and the larger diameter for cutting off the pipe.

The foregoing specification signed at Berlin, Germany, this nineteenth day of December, 1908.

VICTOR MÜLLER.

In presence of—
 HENRY HASPER,
 WOLDEMAR HAUPT.